TAPE TENSION SENSOR

Filed March 27, 1968

INVENTOR.

WARD M. CALAWAY

United States Patent Office
3,497,158
Patented Feb. 24, 1970

3,497,158
TAPE TENSION SENSOR

Ward M. Calaway, Sierra Madre, Calif., assignor to Consolidated Electrodynamics Corporation, Pasadena, Calif., a corporation of California Filed Mar. 27, 1968, Ser. No. 716,567
Int. Cl. B65h 25/10
U.S. Cl. 242—190 7 Claims

ABSTRACT OF THE DISCLOSURE

A photoelectric assembly for sensing tape tension including a guide means biased against the tape and supported about a pivot point, the supporting means, including a shutter portion, being pivotally displaceable as a function of tape tension. The shutter portion lies between a light source and light sensing means and its displacement yields a signal to control the tape reel drive to maintain uniform tape tension.

BACKGROUND OF THE INVENTION

Field of the invention

The field of art to which the invention pertains includes the field of winding and reeling, particularly the subfield of fabric tension devices.

Description of the prior art

In the data processing industry, the use of magnetic tape as a data storage medium has become standard in many applications. However, tape recorders are subject to sources of inaccuracy which may prevent accurate use of tape if certain physical conditions are not continuously monitored and controlled. One of the conditions which must be monitored is the tension present in the tape as it moves through the tape guides and past heads on a tape transport deck. If tape tension is too high, there is a tendency for the tape to elongate with a resultant change of frequency. Conversely, if tape tension is too slight, the tape can become fouled in its guides. The tape utilized in digital data processors usually moves at high speeds and reversing of the tape occurs very rapidly. If the tension in the tape is too little, slack may cause the tape to become disengaged from its guide rollers or posts, increasing the chance of breakage.

For the foregoing reasons, the tension applied to the tape must be held constant during a given run, as well as from run to run. This requires continuous monitoring and control of tape tension. Some prior devices have provided continuous control by using rollers biased against the tape and associated with transformers or potentiometers; while effective, such devices are relatively expensive and introduce tape drag. Many other devices have provided only intermittent monitoring and control by the use of limit signals.

SUMMARY OF THE INVENTION

The present invention provides an inexpensive, low-drag and low-inertia means for continuously monitoring and controlling tape tension. It provides a tape transport for tape wound on a reel and comprises reel drive means, a guide member for engaging the tape, means movably supporting the guide member about a pivot point and pivotally displaceable as a function of tape tension, and photoelectric means for sensing displacement of the supporting means and yielding a signal, as a function of the displacement, for controlling the reel drive means. The photoelectric means comprises spaced light emitting means and light sensing means and the supporting means includes a shutter portion between the light emitting means and light sensing means. Light diffusing means can be inserted between the light emitter and sensor.

DESCRIPTION OF THE PREFERRED EMBODIMENTS

Figures 1, 2:
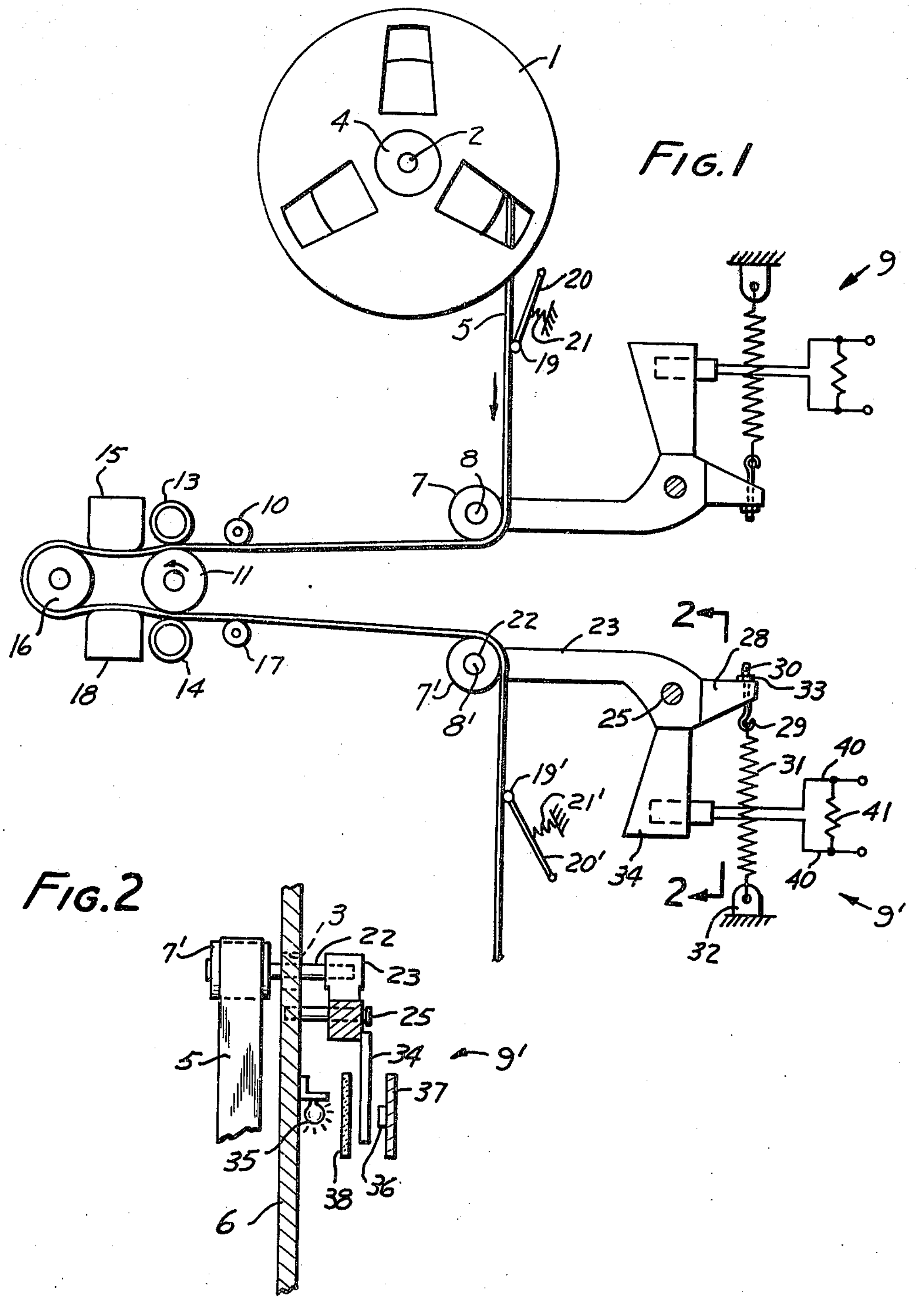
FIG. 1 is an elevational view of a portion of a tape transport deck utilizing this invention and showing somewhat schematically the tape tension sensing assembly underlying the deck.
FIG. 2 is a side view of the photoelectric tape tension sensing assembly of this invention taken on line 2—2 of FIG. 1.

Referring to FIG. 1, a tape reel 1 is shown having a pair of spaced-apart reels (only one reel is shown). The reel 1 is mounted and centered to a shaft 2 by a hub 4. A length of magnetic tape 5 has one end threaded into engagement with the drum of the reel 1. From the reel 1, the tape 5 is passed around a rotatable and movable guide member or idler roller 7. The guide member 7 is rotatable about an axis 8 and is movable, i.e., translatable, within a slot 3 in the transport deck 6 (see FIG. 2). In terms of the apparatus of this invention, the guide roller 7 is a tape tension-sensing roller as part of a tape tension-sensing assembly 9.

The tape 5 is fed around the periphery of guide roller 7, past a guide 10 and from there it passes adjacent a constantly rotating capstan 11 having a pair of pinch rollers 13 and 14 adjacent thereto. After passing between roller 13 and capstan 11 the tape 5 travels past a head assembly 15, over the turn around roller 16 of a tachometer, past a head assembly 18, back through the gap between the capstan and roller 14, and then over a tape guide 17. From tape guide 17, the tape 5 passes over the guide member 7′, mounted for rotation about axis 8′, of a second tape tension-sensing assembly 9′, and from there to the other reel of the reel pair.

End-of-tape sensor rollers 19 and 19′ are very lightly biased against the tape adjacent each of the reels by means of arms 20 and 20′ and springs 21 and 21′. Circuitry (not shown) associated with these end-of-tape sensors yield a signal when the tape is broken, or when the tape tension is below predetermined broad limits, to stop the apparatus.

Referring to the tape tension-sensing assembly 9′, as illustrating the operation of both assemblies 9 and 9′, roller 7′ is rigidly mounted to an axle 22 having the axis 8′. Axle 22 is rotatably mounted to a pivot arm 23 which moves about a pivot axle 25 extending from the rear side of the tape transport deck 26 (see FIG. 2). The pivot arm 23 has an extended portion 28 on the opposite side of the pivot axle 25 through which a hook 29 is engaged. A spring 31 engages the hook 29 and is secured by anchor 32 to the under side of the transport deck 26. Hook 29 has a threaded portion 30 extending through arm extension 28 and is adjustably secured thereto by a nut 33 so that spring tension may be adjusted. The spring 31 is adjusted to bias the pivot arm 23 into a predetermined position of correct tension. A shutter 34 is affixed to pivot arm 23 between axle 22 and arm extension 28, and extends downwardly from pivot axle 25.

Referring to both FIGS. 1 and 2, a light source which may be a simple light bulb 35 is provided affixed to the under side of tape deck 6 and overlies shutter 34. An elongated silicon solar cell 36, or other photovoltaic cell, is supported by support member 37, underlying shutter 34, opposite light bulb 35. A light diffuser 38, e.g. smoked glass or glass having a ground surface, is provided adjacent the light bulb 35 so that light therefrom is evenly diffused to the photocell 36.

Electrical leads 40 are provided (FIG. 1 only) from the photocell 36 so that current generated by the solar cell 36 and flowing across a load 41 yields a signal proportional to the solar cell exposure. With a silicon solar cell 36 and a load 41 having a resistance such that full exposure of the solar cell 36 produces an output voltage of 200 millivolts or less, the output voltage of the solar cell 36 is proportional to its exposure.

The force of tape tension is balanced by the force exerted by extension of the spring 31, producing an angular deflection of the pivot arm 23 proportional to tape tension. As the pivot arm 23 deflects, a greater or lesser portion of the solar cell 36 is exposed to the light from bulb 35. The shutter 34 and solar cell 36 are arranged so that increased tape tension causes the shutter 34 to cover an increased amount of the solar cell 36, the solar cell 36 producing a signal proportional to its length exposed to the light. A feedback mechanism (not shown) receives the signal and causes an increase or decrease in the voltage applied to the reel motor such that the torque of the motor is changed. The change in motor torque is manifested through reel 1 to alter the tension in tape 5 and to return the pivot arm 23 to its position of correct tension.

With the foregoing assembly, tape tension to output voltage transduction is linear and a direct electrical analog of tape tension is produced, requiring no transformers, or like components. Tape drag is very low, being only that of the guide roller 7. Response time is virtually instantaneous, limited only by the inertia of the arm 23. It may be noted that failure of the light source 35 results in a signal indicating zero tension and, in the event of such light failure, the control circuits would relax the tape 5 to avoid tape damage. On the other hand, tape breakage would cause the control circuits to apply full power to the reeling motors, winding the tape 5 on the reels and avoiding tape slippage.

While the invention has been described above in conjunction with specific apparatus, this has been by way of example only and is not to be considered as a limitation to the scope of this invention.

I claim:

1. A tape transport for tape wound on a reel, comprising:
- reel drive means,
- a guide member for engaging the tape,
- means movably supporting the guide member about a pivot point and pivotally displaceable as a function of tape tension,
- a source of light,
- a photovoltaic cell of predetermined length spaced from the light source to receive light therefrom to generate a signal voltage proportional to the amount of its length exposed to said light for controlling the reel drive means, and
- a shutter between the source of light and the photovoltaic cell and operatively associated with said supporting means to lengthwise expose the photovoltaic cell as a function of displacement of said supporting means.

2. The transport of claim 1 including means disposed between the light source and shutter for diffusing the light.

3. The transport of claim 1 wherein the shutter is disposed so that increased tape tension causes the shutter to cover an increased length of the photovoltaic cell.

4. A photoelectric assembly for sensing tape tension, comprising:
- guide means supported about a pivot point and moveable by tape in response to tension change therein,
- a source of light,
- a photovoltaic cell of predetermined length spaced from the light source and yielding a signal in response thereto, and
- shutter means disposed between the light source and light sensing means and operatively associated with said guide means so as to be displaceable by movement of the guide means to lengthwise expose the photovoltaic cell.

5. The assembly of claim 4 including means disposed between the light source and shutter for diffusing the light.

6. A magnetic tape apparatus, comprising:
- supply and take up tape reels,
- reel drive means for each of the reels,
- guide means associated with each of the reels and engaged by tape extending therefrom,
- means movably supporting each guide member about a pivot point and pivotally displaceable as a function of tape tension,
- a source of light,
- a photovoltaic cell of predetermined length spaced from the light source to receive light therefrom to generate a signal voltage proportional to the amount of its length exposed to said light for controlling the associated reel drive means, and
- a shutter between the source of light and the photovoltaic cell and operatively associated with said supporting means to lengthwise expose the photovoltaic cell as a function of displacement of said supporting means.

7. The assembly of claim 6 including means disposed between the light source and shutter for diffusing the light.

References Cited

UNITED STATES PATENTS

| | | | |
|---|---|---|---|
| 3,131,339 | 4/1964 | Burr | 318—6 |
| 3,244,954 | 4/1966 | Branco | 318—7 |

LEONARD D. CHRISTIAN, Primary Examiner

U.S. Cl. X.R.

242—75.52; 318—7